May 22, 1956
R. H. FISH
2,746,794
AGRICULTURAL SPRAYING MACHINE
Filed May 3, 1954
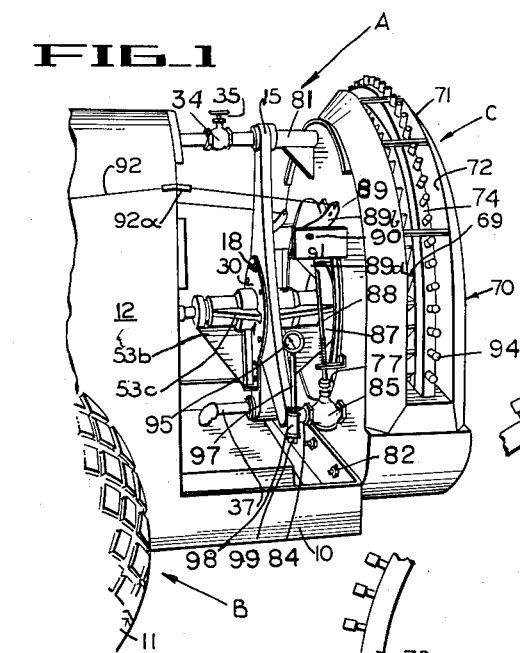
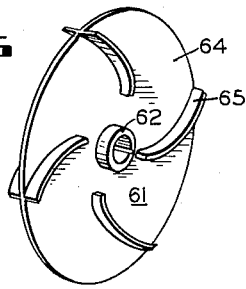
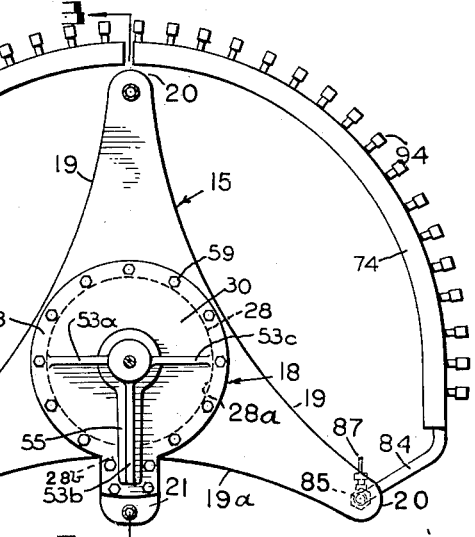
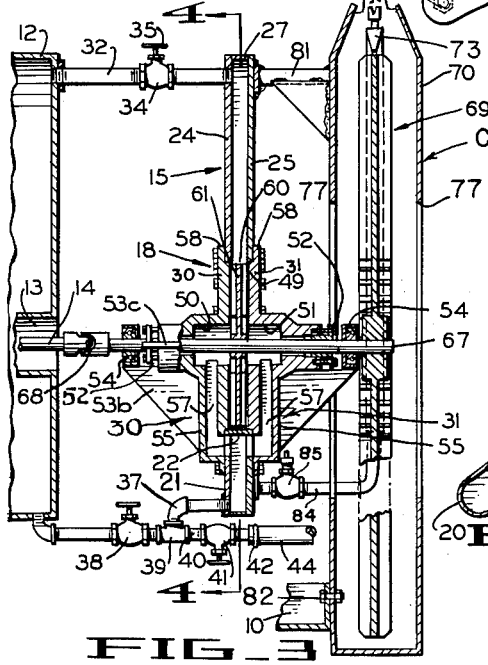
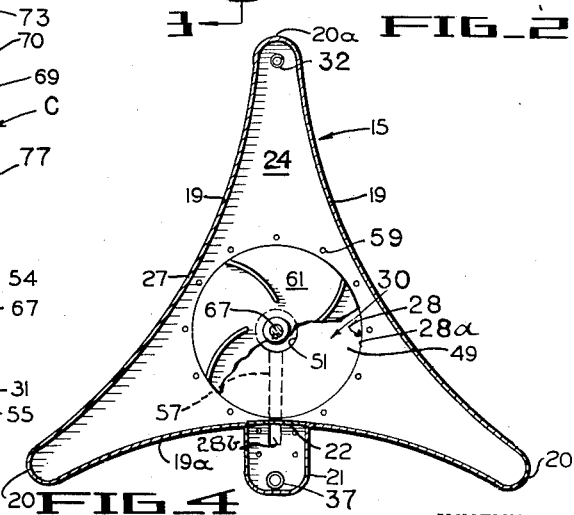
INVENTOR.
RICHARD H. FISH
BY
Hansen and Lane
ATTORNEYS United States Patent Office 2,746,794
Patented May 22, 1956

2,746,794
AGRICULTURAL SPRAYING MACHINE

Richard H. Fish, Morgan Hill, Calif., assignor of one-half to Evalyn Preston, Morgan Hill, Calif.

Application May 3, 1954, Serial No. 426,991

12 Claims. (Cl. 299—45)

The present invention relates to agricultural spraying mechanism, and pertains more particularly to such a mechanism, including a structural pressure chamber for mounting on a tank-carrying vehicle.

It is common practice in applying insecticides and fungicides to orchards and row crops, as well as to other forms of vegetation, to provide spraying mechanism on a tank-carrying vehicle whereby liquid spray droplets are entrained in a radially directed, fan-shaped air blast for air borne conveyance onto the vegetation as the vehicle is driven along through the orchard or field.

Such spraying mechanism frequently is mounted on the rear end of a tank-carrying trailer towed behind a tractor through the orchards or fields of vegetation to be sprayed.

Many agriculturalists who do not have a spray mechanism of this type, do have a tank-carrying trailer of the type which may be towed behind a tractor, and which, if equipped with suitable spray dispensing equipment, would be satisfactory for this use and would thereby obviate the necessity of purchasing an entire spray rig, as the entire assembly is called. Furthermore, many agriculturalists have old spray rigs in which the tank and trailer are in sound operating condition, but in which the spray dispensing mechanism is either of an older and less efficient type, or is in need of substantial repairs.

The present invention contemplates the provision of a unitary spray dispensing apparatus for mounting on a tank-carrying vehicle. Another object is to provide an improved liquid pressure chamber with pump chamber incorporated therewith and arranged for mounting as an integral supporting unit in conjunction with spray conveying, air-blast generating mechanism.

Another object is to make an improved, integrated agricultural spraying apparatus for mounting on a tank truck or trailer.

Another object is to make an improved agricultural spraying apparatus having a liquid chamber in which is mounted a liquid pump comprising complementary portions.

These and other objects and advantages of the invention will be brought out more fully in the following description and the accompanying drawings, wherein Fig. 1 is a perspective view of the rear end portion of a tank-carrying vehicle having a spraying mechanism embodying the present invention mounted thereon.

Fig. 2 is an enlarged vertical transverse sectional view of the pressure chamber liquid pump and spray manifolds shown in Fig. 1 as these parts would appear without the fan housing.

Fig. 3 is a similarly, enlarged, vertical sectional view of the apparatus shown in Fig. 1, taken as along line 3—3 of Fig. 2, the spray manifolds, fan housing and air impeller being shown somewhat diagrammatically.

Fig. 4 is a sectional view through the pressure chamber and liquid pump assembly taken along line 4—4 of Fig. 3.

Fig. 5 is a further enlarged perspective view of the pump impeller.

In general, an agricultural spraying mechanism A shown in Figs. 1 and 3 is mounted on the rear portion of a tank-carrying vehicle B which, for the purpose of the present description, is assumed to be a two-wheeled trailer capable of being hitched to the rear of a conventional farm tractor (not shown).

The trailer B has a chassis 10 fabricated of usual structural steel members and is provided with usual pneumatically tired support wheels 11 (Fig. 1).

A liquid-containing tank 12 is mounted on the chassis 10, and has a tunnel 13 formed to extend lengthwise therethrough to receive a drive shaft 14 which has driven connection at its forward end with a suitable prime mover such as a gasoline engine (not shown).

The spraying unit A is mounted on the trailer B rearwardly of the tank 12 and comprises a chamber 15 in which is mounted a liquid supply pump 18. The chamber 15 serves as an integrating structural element for the entire spraying unit A, which includes a spray dispensing air fan assembly C mounted rearwardly thereof.

In the illustrated form of the invention, the chamber 15 is of flat, generally triangular construction, with concave sides 19 and rounded apexes 20. As illustrated, the chamber 15 is of welded construction, but obviously the method of its manufacture is not material to the present invention.

The chamber 15 is mounted with one rounded apex 20a thereof upright as shown in Fig. 2, and is constructed with a downwardly projecting intake sump 21 located centrally of the curved bottom edge 19a thereof. A closure plate 22 (Figs. 3 and 4) is fitted across the top of the intake sump portion 21 to seal the latter off from the remainder of the interior of the chamber 15, since during operation of the pump 18 it is necessary that the sump 21 be at a relatively low pressure for drawing in water, while the remainder of the chamber 15 is at a relatively high pressure.

As illustrated, the chamber 15 consists of a pair of similar, flat, generally triangular front and rear plates 24 and 25 mounted in corresponding, parallel, spaced relation to each other. A marginal wall member 27 is bent to conform to the corresponding outlines of the front and rear plates 24 and 25 and is fitted therebetween and is attached, as by welding, to both thereof in watertight relation. The front and rear plates 24 and 25 have registering generally keyhole shaped holes 28 therein (Figs. 2 and 4) to receive a pair of similar but oppositely mounted pump housing half portions 30 and 31 one of which is fitted into each of the holes 28 from opposite sides of the chamber 15 in co-axial relation as will be described later herein.

Each of the holes 28 consists of a circular upper portion 28a with a downwardly extending rectangular notched portion 28b which extends below the sump closure plate 22 and exposes the interior of the inlet sump 21.

One end of a by-pass pipe line 32 is connected to open from the chamber 15 near its upper apex 20a into the upper end of the tank 12. A valve 34 is provided in this line 32, said valve preferably being of the well-known pressure relief type to open above a predetermined pressure to allow liquid to by-pass from the chamber 15 into the tank 12 when the pressure in the chamber 15 exceeds the predetermined maximum. In such case the valve 34 preferably is provided with a conventional manual release, such as the valve wheel 35, to allow a free flow of water through the line 32 when filling the tank 12 in a manner to be described later herein.

An inlet pipe line 37 (best shown in Fig. 3) is connected to open from a low point in the tank 12 through conventional fittings and a manually controlled shut-off valve 38 into the downwardly extending intake sump 21 below the chamber 15. The fittings in the line 37 include a T-fitting 39, from one side of which a tank-filling branch pipe 40 is connected.

A manually controlled shut-off valve 41 is provided in the tank filling branch 40, and a hose-coupling fitting 42 is provided on the outer end of this branch pipe 40 for use in coupling a conventional suction hose 44 thereto when it is desired to fill the tank 12 by means of the pump 18. The upper by-pass pipe line 32 and the lower inlet pipe line 37 provide strong, rigid support for the chamber 15 and the parts assembled therewith.

The pump housing half portions 31 and 32 are similar to each other, and preferably are of cast metal and each has a circular, flat boss or pad 49 formed on the inward side thereof when mounted on the chamber 15. These pads 49 fit into the circular portions 28a of the holes 28 in which the pump housing half portions are mounted.

The pump housing half portions 30 and 31 have inlet chambers 50 and 51 respectively (Figs. 3 and 4) formed coaxially of the circular pad portion 49 of each thereof. A shaft sealing gland 52 and a shaft bearing support 54 are provided co-axially beyond each of the inlet chambers 50 and 51 and are braced from their respective housing portions by integrally formed, triangular gusset flanges 53a, 53b and 53c (Figs. 1, 2 and 3). A vertically extending boss 55 having an intake passage 57 cored therein, is formed exteriorly of each housing half portion to communicate between the inlet chambers 50 and 51 and the inlet sump 21.

An integrally formed mounting flange 58 extends marginally around each pump half portion 30 and 31 to overlie the chamber plates 24 and 25, respectively, marginally around the holes 28 therein. These flanges 58 are secured to their respective plates 24 and 25 by cap screws 59 (Figs. 2 and 3). Gaskets or sealing compound (not shown) may be provided between the flanges 58 and their respective plates 24 and 25 to insure water tight connection therebetween.

The sump closure plate 22 secures the front and rear chamber plates 24 and 25 in accurately predetermined spaced relation, and the circular pads 49 on the pump housing half portions 30 and 31 are machined relative to each other and to the inner faces of their marginal flanges 58 to be in true, parallel relation, and spaced apart by a predetermined distance when mounted on the chamber 15 as shown in Figs. 2 and 3. When thus mounted, the inner faces of the pads 49 define a pump impeller chamber 60 therebetween into which the inlet chambers 50 and 51 open axially from opposite sides thereof.

A pump impeller wheel 61 consists of a hub portion 62, a disk portion 64, and curved, radially disposed impeller vanes 65 secured to both sides of the disk portion 64. The impeller 61 is secured to a shaft 67 journaled in the bearings 54 and sealed to the pump housing half portions 31 and 32 by the glands 52. The impeller wheel 61 is of a size and shape to have a running clearance between the pad portions 49 which define the pump chamber 60. The pump shaft 67 is connected at its forward end by means of a universal joint 68 to the engine driven drive shaft 14, and extends rearwardly beyond the rear pump housing portion 38 to provide driving support for an air impeller fan 69 of the fan assembly C.

The air fan assembly C consists of a fan housing 70, generally similar to that shown in my co-pending application Serial No. 296,580, filed July 1, 1952. The air impeller wheel 69 is mounted on the shaft 67 concentrically within the arcuately curved upper portion 71 of the housing 70 to discharge air from the air impeller wheel 69 radially in the form of a fan shaped blast through a slot 72 which extends throughout the curved upper portion of the fan housing 70 and down both sides thereof to a point near the base of the housing. A pair of spray nozzle supporting manifolds 73 and 74, curved to conform to the curvature of the top and sides of the housing 70, and of less width than the air discharge slot 72 are mounted centrally of said slot to be spaced from both major edges 72a and 72b thereof to permit the air blast from the fan to pass outwardly between the manifolds 73 and 74 and these edges of the slot 72.

An air inlet opening 77 is provided centrally of each of the front and rear sides of the fan housing 70. The air impeller fan 69 is generally similar to the pump impeller 61, and consists of a hub portion 78, a disk portion 79, and a plurality of curved, radially extending blades 80 secured to both the front and rear faces of the disk. Upon rotation of the air impeller wheel 69, air is drawn into the fan housing 70 through the central openings 77 in the fan housing, and is discharged radially in a fan shaped blast through the spaces between the spray nozzle manifolds 73 and 74 and the edges 72a and 72b, respectively, of the slot 72.

A fan housing bracing member 81, which may consist of a short length of metal rod or pipe, is secured to extend from the rear face of the chamber 15 adjacent its upper apex 20a, to the fan housing 70. The lower end of the fan housing 70 may be secured by a few bolts 82 to the rear of the trailer chassis 10.

A liquid supply pipe 84 is connected through a normally spring-closed plunger type valve 85 to open into, and to support, the lower end of each arcuately curved spray manifold 73 and 74.

The plunger 87 of each valve 85 is connected by a link 88 to one arm 89a of a bell crank lever 89 pivotally mounted at 90 on a bracket 91 secured to the fan housing 70. The other arm 89b of the bell crank lever has a lanyard 92 connected thereto, which is carried forwardly through a fair lead 92a mounted on a side of the tank 12 to a point adjacent an operator (not shown). Upon pulling a selected lanyard 92 to open either of the valves 85, liquid will be admitted to the spray manifolds 73 and 74 under the pressure generated within the chamber 15 by the operation of the pump impeller 61.

Spray nozzles 94 are mounted at spaced intervals along the outer edges of the manifolds 73 and 74 to discharge liquid in the form of spray droplets radially outwardly from the fan housing 70 for entrainment in the fan shaped air blasts discharged through the spaces between the manifolds 73 and 74 and the front and rear edges of the slot 72.

A liquid pressure gauge 95 for indicating the pressure in the chamber 15 may be mounted on a pipe 97 which in turn may be mounted on the upper end of a conventional T-fitting 98, the side outlet of which is connected to open into the chamber 15. The lower end of the T-fitting 98 may be closed by a conventional pipe plug 99.

In operating the spray mechanism A, if it is desired to fill the vehicle tank 12 from a body of water such as a pond or canal, one end of the suction hose 44 is coupled to the fitting 42 (Fig. 3) and its other end is immersed in the supply of water.

The filling valve 41 is opened and the upper by-pass valve 34 preferably is relieved of pressure to allow water to flow freely through the upper pipe 32 into the tank. The lower inlet valve 38 from the tank 12 to the inlet sump 21, and the spring-closed valves 85 to the spray manifolds 73 and 74 are closed. When the pump impeller 61 is operated with the valves in this condition, water will be drawn from the source of supply, through the suction hose 44, into the sump 21, through the cored inlet passages 57 and the pump inlet chambers 50 and 51 into the pump chamber 60. Thence it will be discharged under pressure into the chamber 15, and will flow therefrom through the upper pipe 32 into the tank 12. When the tank is filled, the pump impeller 61 is stopped and the valve 41 is closed.

To prepare the apparatus for spraying, predetermined pressure is applied to the upper by-pass valve 34 (valve 41 being closed) and the lower inlet valve 38 from the tank 12 is opened. With the valves in such condition, upon again operating the drive shaft 14 to rotate the pump impeller 61 and fan impeller 69, liquid will bend to be drawn from the tank 12 through the inlet pipe line 17, inlet sump 21 and inlet passages 57 into the pump chamber 60. Thence it will be discharged into the pressure chamber 15 and will build up pressure therein. The speed of rotation of the pump impeller 61 and the pressure setting of the upper by-pass valve 32, in the event that a pressure relief valve is employed at this point, may be used to control the liquid pressure within the chamber 15. In the event that the upper by-pass valve 32 is merely a conventional shutoff valve, however, such as that known as a "globe" or "gate" valve, the fact that the pump 18 is of the single stage centrifugal discharge type will prevent the creation of dangerously high pressure in the chamber 15 even with all of the valves except the inlet valve 37 closed.

The velocity of the fan shaped air blast discharged through the spaces between the manifolds 73 and 74 and the edges 72a and 72b respectively of the slot 72 in the fan housing 70 may also be controlled by the speed of rotation of the pump shaft 67.

When not actually discharging spray material, the engine driving the shafts 14 and 67 preferably is allowed to run at low or idling speed. When it is desired to operate the spraying mechanism A to discharge spray however, the engine preferably is speeded up to increase the pressure in the chamber 15 and also to increase the velocity of the air blast discharged from the fan housing 70.

To discharge spray from the nozzles 94, either or both of the valves 85 may be opened by the operator pulling on selected lanyards 92 connected thereto. This admits liquid under pressure from the chamber 15 through the selected pipe or pipes 84 and into selected manifolds 73 and 74, whence it is discharged in the form of spray droplets through the nozzles 94 and is entrained in the high-speed, fan-shaped air blast from the fan housing 70 to be carried thereby outwardly and upwardly onto the vegetation to be sprayed.

The invention provides a simple, unitary and sturdy agricultural spraying assembly which may be easily mounted as a replacement unit on an existing spray rig, and which also lends itself to low-cost, high-output production in the manufacture of new agricultural spraying devices.

While I have illustrated and described a preferred embodiment of the present invention, it will be understood however, that various changes and modifications may be made in the details thereof without departing from the spirit and scope of the invention as set forth in the appended claims.

Having thus described the invention, what I claim as new and desire to protect by Letters Patent is defined in the following claims.

I claim:

1. As a structural element of an agricultural spraying mechanism including a vehicle, a liquid supply tank mounted on the vehicle, a fan housing mounted on the vehicle in spaced relation to the tank, a fan impeller mounted in the fan housing, a spray manifold mounted to direct spray particles into an air blast from the fan housing, and a power driven drive element; a combined liquid pressure chamber and mounting unit comprising a pressure chamber of generally equilateral triangular shape, the sides of said triangular chamber being concave, said chamber being constructed for mounting with a predetermined apex thereof directed upwardly, valve controlled pipe means connecting each of the upper and lower portions of said chamber to the tank, valve controlled pipe means connected to a lower apex of said chamber for communication with a spray manifold, a support element mounted on the upper end of said chamber and extending oppositely to the pipe connecting the upper end of the chamber to the tank for supporting connection to the fan housing, and a drive shaft journaled substantially centrally of said chamber and in driven relation with said drive element, the fan impeller being mounted on a projecting portion of said shaft for rotation therewith.

2. As a structural element of an agricultural spraying mechanism including a vehicle, a liquid supply tank mounted on the vehicle, a fan housing mounted on the vehicle in spaced relation to the tank, a fan impeller mounted in the fan housing, a spray manifold mounted to direct spray particles into an air blast from the fan housing, and a power driven drive element; a combined liquid pressure chamber and mounting unit comprising a thin, flat pressure chamber of generally equilateral triangular shape, the sides of said triangular chamber being concave, said chamber being constructed for mounting with a predetermined apex thereof directed upwardly, a pump mounted transversely of said chamber to discharge interiorly thereof, means drivingly connecting said drive element to said pump, valve controlled pipe means connecting each of the upper and lower portions of said chamber to the tank, the lower of said tank connecting pipes opening into the intake of said pump, valve controlled pipe means connected to a lower apex of said chamber for supporting communication with a spray manifold, and a support element mounted on the upper end of said chamber and extending therefrom for connection to the fan housing.

3. As a structural element of an agricultural spraying mechanism including a vehicle, a liquid supply tank mounted on the vehicle, a fan housing mounted on the vehicle in spaced relation to the tank, a spray manifold mounted to direct spray particles into an air blast from the fan housing, and a power driven drive element; a combined liquid pressure chamber and mounting unit comprising a pressure chamber of generally equilateral triangular shape, the sides of said triangular chamber being concave, said chamber being constructed for mounting with a predetermined apex thereof directed upwardly, a pair of pump housing portions fitted into said chamber from opposite sides thereof and spaced apart to define an impeller chamber therebetween, a pump impeller journalled in said impeller chamber, a valve controlled conduit connecting each of the upper and lower portions of said chamber to the tank, valve controlled pipe means connected to the lower end of each of the other two apexes of said chamber for connection to one of the spray manifolds, a support element connecting the upper end of said chamber to the fan housing, a fan impeller mounted in the fan housing, and means drivingly connecting said drive element to said pump impeller and to said fan impeller.

4. As a structural element of an agricultural spraying mechanism which includes a vehicle, a liquid supply tank mounted on the vehicle, a fan housing mounted on the vehicle in longitudinally spaced relation to the tank, a spray manifold mounted to direct spray particles into an air blast from the fan housing, and a power driven drive element; a thin liquid pressure chamber mounted in upright position transversely of the vehicle between the tank and the fan housing, a valve controlled conduit structurally connecting each of the upper and lower ends of the pressure chamber to the tank for controlled communication therewith, a valve controlled conduit structurally connecting a lower portion of the pressure chamber to a spray manifold for controlled communication therewith, a pump housing mounted on the pressure chamber, aligned bearing means mounted in said pump housing coaxially with the fan housing, a pump shaft journaled in said bearings and in driven connection with said drive element, said pump shaft extending into said fan housing, a pump impeller secured to said pump shaft within the pump housing for rotation therein, and a fan impeller secured to the pump shaft within the fan housing for rotation therein.

5. As a structural element of an agricultural spraying mechanism which includes a vehicle, a liquid supply tank mounted on the vehicle, a fan housing mounted on the vehicle in longitudinally spaced relation to the tank, a spray manifold mounted to direct spray particles into an air blast from the fan housing, and a power driven drive element; a thin liquid pressure chamber mounted in upright position between the tank and the fan housing, said chamber being of substantial height relative to the height of the tank and having a pair of registering openings in the front and rear sides, respectively, thereof, a valve controlled conduit structurally connecting each of the upper and lower ends of the pressure chamber to the tank for controlled communication therewith, a valve controlled conduit structurally connecting a lower portion of the pressure chamber to a spray manifold for controlled communication therewith, a pair of similar liquid supply pump housing half portions mounted from opposite sides of the pressure chamber one in each of said registering openings therein, aligned bearing means mounted one in each of said pump housing portions for alignment coaxially with each other and with the fan housing, a pump shaft journaled in said bearings and in driven connection with said drive element, a pump impeller secured to said pump shaft between the pump housing half portions for rotation therebetween, and a fan impeller secured to the pump shaft within the fan housing for rotation therein.

6. As a structural element of an argricultural spraying mechanism which includes a vehicle, a liquid supply tank mounted on the vehicle, a spray manifold mounted on the vehicle in longitudinally spaced relation to the tank, and a power driven drive element; a liquid pressure chamber mounted in upright position between the tank and the spray manifold, said pressure chamber having substantially flat front and rear wall portions having oppositely located openings therein, a valve controlled conduit communicating the pressure chamber with the tank, a liquid supply pump housing mounted in the openings in the front and rear wall portions of the pressure chamber and sealed to said walls marginally of said holes, said housing having an inlet, a conduit communicating said inlet with the tank, said pump housing also having an outlet opening into the pressure chamber, a pump shaft journaled in said pump housing, a valve controlled conduit communicating the pressure chamber with the spray manifold, a driving connection between the pump shaft and said drive element, and a pump impeller secured to said pump shaft within the pump housing for rotation therein.

7. As a structural element of an agricultural spraying mechanism which includes a vehicle, a liquid supply tank mounted on the vehicle, a fan housing mounted on the vehicle in longitudinally spaced relation to the tank, a spray manifold mounted to direct spray particles into an air blast from the fan housing, and a power driven drive element; a liquid pressure chamber mounted in upright position between the tank and the fan housing, said pressure chamber having substantially flat front and rear wall portions having matching openings therein, a valve controlled conduit communicating the pressure chamber with the tank, a liquid supply pump housing mounted in the openings in the front and rear wall portions of the pressure chamber and sealed to said walls marginally of said holes, said housing having an inlet, a pipe communicating said inlet with the tank, a pump shaft journaled in said pump housing and extending toward the fan housing, a valve controlled conduit communicating the pressure chamber with the spray manifold, a driving connection between the pump shaft and said drive element, a pump impeller secured to said pump shaft within the pump housing for rotation therein, and a fan impeller mounted within the fan housing and connected to the drive element for rotation thereby.

8. As a structural element of an agricultural spraying mechanism which includes a vehicle, a liquid supply tank mounted on the vehicle, a fan housing mounted on the vehicle in longitudinally spaced relation to the tank, a spray manifold mounted to direct spray particles into an air blast from the fan housing, and a power driven drive element; a liquid pressure chamber mounted in upright position between the tank and the fan housing, said pressure chamber having an opening therein, a valve controlled conduit communicating the upper end of the pressure chamber with the tank, a liquid supply pump housing mounted in the opening in the pressure chamber and sealed marginally to the pressure chamber, said housing having an inlet, a conduit communicating said inlet with the tank, said housing having a peripheral outlet extending throughout a substantial portion of the periphery of the housing and communicating directly with the interior of the pressure chamber, a pump shaft journaled in said pump housing and extending into the fan housing, a valve controlled conduit communicating the pressure chamber with the spray manifold, a driving connection between the pump shaft and said drive element, a pump impeller mounted within the pump housing and connected in driven relation to the drive element, and a fan impeller mounted within the fan housing and connected in driven relation to the drive element.

9. As a structural element of an agricultural spraying mechanism which includes a vehicle, a liquid supply tank mounted on the vehicle, a fan housing mounted on the vehicle in longitudinally spaced relation to the tank, a spray manifold mounted to direct spray particles into an air blast from the fan housing, and a power driven drive element; a liquid pressure chamber mounted in upright position between the tank and the fan housing, said pressure chamber having substantially flat front and rear wall portions having matching openings therein, each opening having a circular portion, a valve controlled conduit communicating the pressure chamber with the tank, a pair of liquid supply pump housing half portions, each having a circular pad on the inner side thereof of a diameter to fit into the circular portion of one of said openings, each half portion being mounted on one of said flat wall portions with the pad on each fitted into the circular hole portion of its respective wall portion, and sealed to the wall marginally of said hole, the inner faces of the pads being spaced apart to define an impeller chamber therebetween, one housing portion having an inlet, a conduit communicating said inlet with the tank, a pump shaft journaled in said housing portions and projecting therefrom toward the fan housing, a valve controlled conduit communicating the pressure chamber with the spray manifold, a driving connection between the pump shaft and said drive element, a pump impeller secured to said pump shaft within the impeller chamber for rotation therein, and a fan impeller mounted within the fan housing and connected to the drive element for rotation thereby.

10. As a structural element of an agricultural spraying mechanism which includes a vehicle, a liquid supply tank mounted on the vehicle, a fan housing mounted on the vehicle in longitudinally spaced relation to the tank, a spray manifold mounted to direct spray particles into an air blast from the fan housing, and a power driven drive element; a liquid pressure chamber mounted in upright position between the tank and the fan housing, an intake sump formed on the bottom of said pressure chamber, said pressure chamber having substantially flat front and rear wall portions having matching keyhole shaped holes therein, a circular upper portion of each hole opening into the pressure chamber, and a downward extension of each hole opening into the sump, a valve controlled conduit communicating the pressure chamber with the tank, a second conduit communicating the sump with the tank, a pair of liquid supply pump housing portions, each having a circular pad thereon of a size to fit into the circular portion of one of said holes, the pump portions being mounted one on each flat wall portion with the pad on each pump portion fitted into the circular hole portion of its respective hole, an intake duct on each pump portion overlying a downward hole extension and communicating the sump with a central portion of the pad on each housing portion, said housing portions being sealed to said flat wall portions marginally around said holes, a pump shaft journaled in said housing portions centrally of the pads thereon, a valve controlled conduit communicating the pressure chamber with the spray manifold, a driving connection between the pump shaft and said drive element, a pump impeller secured to said pump shaft within the pump housing for rotation therein, and a fan impeller mounted within the fan housing and connected to the drive element for rotation thereby.

11. As a structural element of an agricultural spraying mechanism which includes a vehicle, a liquid supply tank mounted on the vehicle, a fan housing mounted in longitudinally spaced relation to the tank, a spray manifold mounted to direct spray particles into an air blast from the fan chamber, and a power driven drive element; a thin liquid pressure chamber of substantial height and width relative to the height and width of the tank, said chamber having a pump mounting hole in each of the front and rear walls thereof, an intake chamber adjacent said pressure chamber and sealed therefrom, a pair of pump housing half portions inserted one from each side of the pressure chamber into the holes therein to define a pump chamber therebetween, a conduit on each pump housing portion communicating with the intake chamber, a conduit communicating between a low portion of the tank and the inlet chamber, a valve controlled conduit communicating between the tank and the pressure chamber, a pump shaft journaled in the pump housing portions, and extending through the pump chamber defined thereby, a pump impeller mounted on the pump shaft in said pump chamber and connected to the pump shaft for rotation therewith, a fan impeller mounted for rotation coaxially with the pump shaft within the fan housing, and a driving connection between the drive element, the pump shaft, and the fan impeller.

12. As a structural element of an agricultural spraying mechanism which includes a vehicle, a liquid supply tank mounted on the vehicle, a fan housing mounted in longitudinally spaced relation to the tank, a spray manifold mounted to direct spray particles into an air blast from the fan chamber, and a power driven drive element; a thin liquid pressure chamber of substantial height and width relative to the height and width of the tank, said chamber having a pump mounting hole in each of the front and rear walls thereof, an intake chamber mounted on the pressure chamber and sealed therefrom, a pair of pump housing half portions inserted one from each side of the pressure chamber in said holes to define a pump chamber therebetween, a conduit on each pump housing portion communicating with the intake chamber, a valve controlled conduit communicating between a low portion on the tank and the inlet chamber, a pump shaft journaled in the pump housing portion and projecting axially therebeyond, a pump impeller mounted on the pump shaft within the impeller chamber defined by the pump housing portions, a fan impeller mounted within the fan housing, and driving connection between the drive element, the pump shaft and the fan.

References Cited in the file of this patent

UNITED STATES PATENTS 2,551,789    Copley   ---------------- May 8, 1951